United States Patent
Amrani

(10) Patent No.: US 8,371,223 B2
(45) Date of Patent: Feb. 12, 2013

(54) USE OF PRINTING INK FOR PRODUCTION OF PARTS HAVING A PRECUT SKIN

(75) Inventor: Karim Amrani, Méru (FR)

(73) Assignee: Faurecia Interieur Industrie, Nanterre (FR)

( * ) Notice: Subject to any disclaimer, the term of this patent is extended or adjusted under 35 U.S.C. 154(b) by 905 days.

(21) Appl. No.: 11/994,347

(22) PCT Filed: Jun. 7, 2006

(86) PCT No.: PCT/FR2006/001290
§ 371 (c)(1),
(2), (4) Date: Dec. 31, 2007

(87) PCT Pub. No.: WO2007/003728
PCT Pub. Date: Jan. 11, 2007

(65) Prior Publication Data
US 2008/0196615 A1    Aug. 21, 2008

(30) Foreign Application Priority Data
Jun. 29, 2005  (FR) ...................................... 05 06658

(51) Int. Cl.
*B29C 44/12* (2006.01)
(52) U.S. Cl. ...................................................... 101/491
(58) Field of Classification Search ................... 101/491
See application file for complete search history.

(56) References Cited

U.S. PATENT DOCUMENTS

| | | | | |
|---|---|---|---|---|
| 5,656,677 A * | 8/1997 | Jourquin et al. | ............... | 521/126 |
| 5,894,048 A * | 4/1999 | Eckart et al. | ................... | 428/339 |
| 2003/0212237 A1* | 11/2003 | Johnston | ......................... | 528/60 |
| 2005/0218556 A1* | 10/2005 | Donatti et al. | ................ | 264/240 |
| 2006/0127666 A1* | 6/2006 | Fuchs | ........................... | 428/343 |

FOREIGN PATENT DOCUMENTS

| | | |
|---|---|---|
| DE | 298 21 409 | 3/1999 |
| EP | 1 288 081 | 3/2003 |
| EP | 1288081 A2 * | 3/2003 |
| JP | 06 099785 | 4/1994 |
| JP | 10 029488 | 2/1998 |
| JP | 10 044908 | 2/1998 |

* cited by examiner

*Primary Examiner* — Joshua D Zimmerman
(74) *Attorney, Agent, or Firm* — Young & Thompson

(57) ABSTRACT

Method of using a viscous printing ink for the protection of a notch formed in a skin which is intended for a part that is produced using a method including: producing a skin (1) having a notch (2) on the inner face thereof, covering the notch (2) with a protective element, and forming a foam (3) which is in contact with the inner face of the skin. According to the invention, during the notch-covering step, an ink having a viscosity that is at least equal to 0.6 St is applied to the notch (2) via printing and, subsequently, the ink is hardened such as to form a layer (4) that provides a bridge over the notch (2) without extending to the base thereof. The invention is suitable for motor vehicle instrument panels.

9 Claims, 1 Drawing Sheet

USE OF PRINTING INK FOR PRODUCTION OF PARTS HAVING A PRECUT SKIN

The present invention concerns a new use of a printing ink for the production of parts having a precut skin, more precisely a viscous printing ink for protection of a notch formed in a skin of a part comprising a foam, one face of which is covered by a skin.

Parts are already produced in which a skin is arranged on a foam, wherein the latter can itself be placed on a support or not. Such parts are in general made by arranging the skin against a mould surface, then by injection or formation of the foam in situ.

In particular such parts are used for dashboards and trims in passenger compartments of automobiles. It is then frequently necessary for airbags to be arranged behind these parts. To facilitate the function of these airbags, the visible part has weakening lines which follow the contour of an element which must be torn on deployment of the airbag. For this tearing to be easy, the support where applicable and the skin are weakened locally following the desired tear contour.

In the case of the skin, it is common to produce a notch which follows a line, continuous or discontinuous, corresponding to at least part of the opening contour. For example, the line can be practically continuous for tearing a portion of the part or it can delimit all sides except a polygon delimiting the portion to be torn which, on deployment of the airbag, pivots about the side which has not been weakened.

For production of such components therefore notches have been made in the inner face of the skin so that the notch is not visible from the visible exterior side.

The simple formation of a notch without modification of the production process is not satisfactory. In fact the foam, when it later forms on the inner face of the skin, can penetrate into the notch and then cause two drawbacks.

The first drawback is that the chemical products of the foam can cross the thinner part of the skin corresponding to the base of the notch so well that a mark appears on the visible side. The second drawback is that the foam sticks to the faces of the notch and can even draw these faces together, causing them to "reseal". In some cases even the mechanical strength of the notch filled with foam may be no less than that of the skin without notch. The notch is then inoperative.

To solve this problem, a stripping product has already been applied to the notch with the am of preventing the adhesion of the foam to the notch. Such an application however poses problems. In fact it must not be too extensive around the notch, so as not to prevent the adhesion of the foam to the skin, as the difference in behaviour in comparison with portions with skin-foam adhesion may appear on the visible side.

However, the most important problem is that the stripping product applied does not always reach the narrow base of the notch. If application to the base of the notch is not verified, the said drawbacks can occur. It is therefore necessary to use an additional operation to verify that the stripping product is present in the base of the notch over its entire length. Although this operation can be facilitated by use of a stripping product of colour contrasting with that of the skin, it still requires additional verification and is therefore costly.

It has therefore already been proposed to protect the notch against penetration of foam by the formation of a bridge closing the opening of the notch.

Thus document DE-298 21 409 describes an interior trim part of an automobile passenger compartment with a layer which promotes the adhesion formed between the skin and the foam; a notch is closed by a cover intended to prevent the penetration of the adhesion-promoting layer. This document indicates simply that the notch is protected by a cover which can be a "protective lacquer" which fills the weakened place but has only a low strength, such that function of the notch is not disrupted. According to this document, the protective lacquer at least partly fills the notch and covers the adjacent portion thereof.

Document EP-1 288 081 describes the arrangement on the notch of a "sealing layer". This can be made of polyurethane. The document cites only spraying as the process for production of this cover, and indicates that the material may be a polyurethane. Spraying requires a relatively fluid raw material to give the necessary fineness to the particles.

After tests relating to the implementation of the teaching of this document EP-1 288 081, the Applicant realised that it was not possible to produce a cover layer which did not penetrate into the notch by simple application of a product by spraying. He also realised that, given the width of the notch at the level of the inner face of the skin (at least several tenths of a millimeter), it was not possible to form a continuous cover over the opening of the notch with a composition with sufficient fluidity to be able to be applied by spraying.

Tests then showed that a viscous product applied by printing allowed formation of a continuous cover over the opening of the notch, this product being so viscous that it could not be applied by spraying.

More precisely, the invention concerns a new use of a viscous printing ink for protection of a notch formed in a skin intended for a part produced by a process which comprises production of a skin with a notch on its inner face, the covering of the notch by a protective element, and the formation of a foam on contact with the inner face of the skin; according to the invention the step of covering the notch with a protective element comprises application of an ink with a viscosity equal at least to 0.6 St by a printing operation, then its at least partial hardening such that the ink forms a layer which constitutes a bridge over the notch without filling this at least down to its base.

Within the context of the invention, a "viscous" ink corresponds to a viscosity of at least 0.6 St, advantageously of the order of 1 to 4 St. It is even possible that the viscous ink has the consistency of a paste.

Preferably the new use according to the invention also comprises, for printing, a step of selecting the ink whose chemical composition and physical properties are such that its adhesion to the skin is less than its adhesion to the foam after formation of the latter.

Preferably the new use according to the invention also comprises, for printing, a step of selecting an ink such that, after printing, it forms a layer of thickness between 20 and 200 μm.

The printing operation is advantageously screen printing or offset printing.

The at least partial hardening is achieved by drying, by gelification, by polymerisation with reticulation or by ultraviolet irradiation depending on the properties of the viscous ink used.

When the notch follows a line with at least one elongated section, the printing operation of the viscous ink is advantageously performed over the entire line with an overlap all around the line. Preferably the overlap, on each side of the line, is at least equal to half the width of the notch in the plane of the inner face.

Other characteristics and advantages of the invention will be better understood on reading the description below of a production example with reference to the attached drawing on which:

Figure 1:
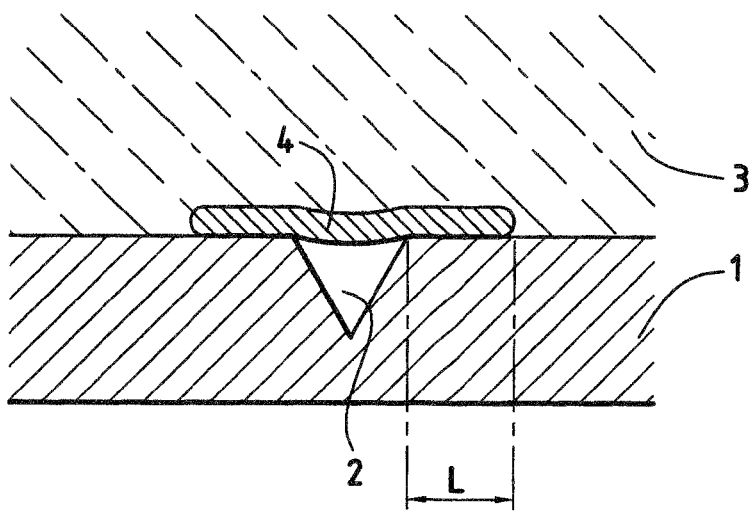
FIG. 1 is a very enlarged cross-section illustrating the use of a viscous ink according to the invention.
Figure 2:
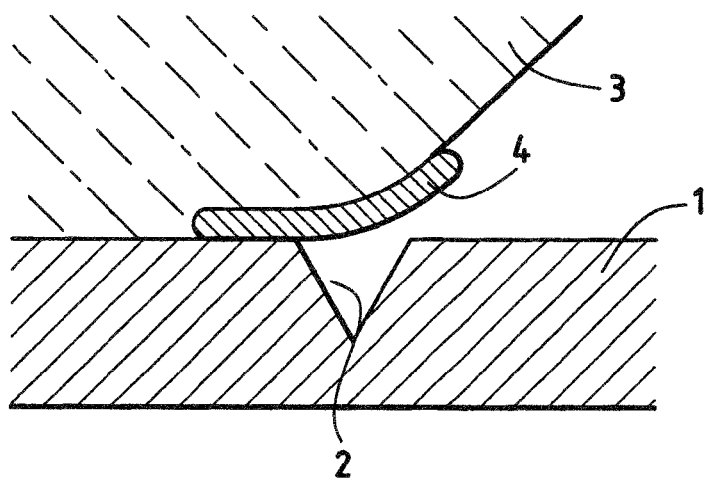
FIG. 2 is a section similar to FIG. 1 illustrating the behaviour of the layer of ink when the foam is separated from the skin.

In the known manner, when a foam is injected, for example marked by reference 3 on FIG. 1, into a mould fitted on one face with a skin 1 having a notch 2, the injected foam penetrates freely into the notch 2. Its effect then is not only to fill this, thus reducing the effect of mechanical weakening, but also to react chemically with tendency to draw together the walls of the notch 2 according to a phenomenon known as "reseal". During destructive tests it has been found that the skin can break at locations other than at the notch 2.

The solution to this problem comprises the formation of a bridge over the notch to prevent penetration of the foam. This bridge is obtained according to the invention by the printing of a very viscous ink, advantageously practically paste-like, marked by reference 4 on the figures.

The advantage of a printing process is that it does not cause the ink to penetrate inside the notch 2. The advantage of a viscous ink is that it remains cohesive above the notch, between the portions of ink applied on either side of the notch. The invention is based on the combination of means which give these two advantages.

The printing process can be practically any process, although screen printing and offset printing are particularly advantageous. Screen printing is particularly advantageous as it can be implemented with stencils normally used, with mesh sizes of 40 to 70 for example.

The viscosity can be any viscosity provided it exceeds 0.6 St. It is however advantageous to use a more viscous ink, from 1 to 4 St, and even of paste-like consistency, i.e. of viscosity even higher than the values given.

Also it is found by experiment that the desired effect is obtained when the width of the overlap, i.e. the width L over which the viscous ink 4 overlaps beyond the edge of the notch 2, is at least half the width of the notch in the plane of the inner face. In general, this notch width is slightly less than or equal to the notch depth.

The process comprises the at least partial hardening of the ink before formation of the foam. Depending on the nature of the ink, this hardening can be achieved by drying, by evaporation of at least one solvent, by polymerisation with reticulation in the case of a two-component ink, or by ultraviolet irradiation in the case of a photo-sensitive ink.

According to an advantageous refinement of the invention, the chemical composition and physical properties of the ink are such that, after arrangement of the foam 3, the adhesion of the hardened ink layer 4 to the foam 3 is greater than its adhesion to the skin 1. Thus the ink layer 4 tends to behave like the foam 3 rather than like the skin 1, such that the presence of this ink layer 4 inside the part is not visible even when there is a very wide overlap.

Figure 3:
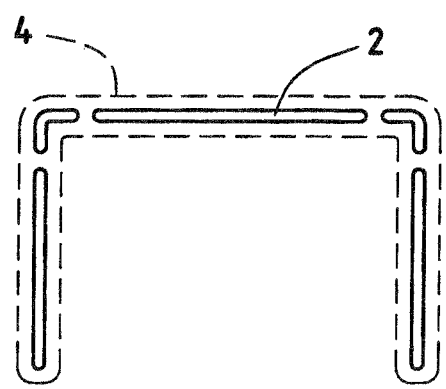
FIG. 3 represents an example of the line of a notch intended to delimit a passage opening for an airbag.

FIG. 3 shows an example application of the invention. Note that the notch 2 is discontinuous and comprises five sections which delimit three sides of an airbag hatch. The dotted line surrounding the notch 2 represents the limits of the viscous ink layer 4. Note that the ink overlaps on all sides of the notch, even at the ends.

In an example application, the skin 1 is a flexible skin of polyvinylchloride, the foam 3 is polyurethane-based, and the viscous ink is a polyvinylchloride plastisol, for example a "Wilflex speciality white" commonly used in "transfer" technology.

These inks made from plastisols gelify (at a temperature between 65 and 120° C.) into a dry but not set state, then undergo setting or curing (at a temperature of the order of 160° C.) which transforms them into a resistant film which retains a certain flexibility over a textile. Also these inks have the advantages of being practically odourless and paste-like, not drying spontaneously, being able to be applied with a common mesh stencil (for example 25 to 90 mesh per centimeter), and not staining.

In one example, the process used comprises a first production step of production by rotational moulding of a skin, for example of polyvinylchloride, to a thickness of 1 to 1.4 mm.

In a next step, a heated blade of V-section of an angle of the order of 250 forms a pre-cut line, for example for an airbag, so that the residual thickness of the skin is between 0.4 and 0.6 mm.

In a next step, the ink is applied by screen-printing (or any other printing process suitable for plastisols) over and around the precut line. The width of overlap is not critical insofar as the ink forms an effective seal over the entire width of the precut line. The total width of the ink deposit, in the direction transverse to the length of the line, may be 10 mm but a width of just 4 mm has proved sufficient.

In a next step, the screen-printed skin is cured at a temperature and for a time normally used in the conventional process of production of parts of skin and foam, to soften the skin before foaming. This temperature is advantageously between the gelification and curing temperatures of the particular ink used. In one example, the skin remains 1.5 minutes in an oven at a temperature of 110° C.

In a next step, the skin being arranged in a mould, a foam is injected and surrounds the film of ink applied which sets in the open pores of the foam, while continuing to close tightly the opening of the precut line. The temperature reached in this operation is lower than the curing temperature of the ink, such that this remains in an unset, gelified state.

In this example, the ink film plays its role as seal without having been cured and without having adhered to the skin. It therefore has no critical effect which could hinder the function of the airbag, notably the opening of the skin along the precut line.

The main advantages of the invention are the elimination of the said drawbacks, i.e. that the chemical properties of the foam cannot traverse the thinner part to form a mark on the visible side of the skin, and that the foam does not adhere and does not "reseal" the precut line. These advantages are obtained by a simple printing operation, the cost of which may be low, while the products produced have an excellent appearance without visible defect.

The invention claimed is:

1. A method of using a viscous printing ink for protection of a notch formed in a skin intended for a part, the part produced by a process which comprises:
   producing a skin with a notch on an inner face of the skin, the notch having a width of at least several tenths of a millimeter,
   covering the notch by a protective element, and
   forming a foam on contact with the inner face of the skin, wherein the step of covering the notch by a protective element comprises:
      selecting an ink for printing such that an adhesion of the ink to the skin is less than an adhesion of the ink to the foam after formation of the foam, the ink having a viscosity of at least 0.6 St,
      applying the ink to the notch by a printing operation, then, achieving at least partial hardening of the ink, such that the ink forms a layer which constitutes a bridge over the notch without filling the notch at least down to a base of the notch, wherein the printing operation is screen printing.

2. The method according to claim 1, wherein the ink is selected for printing such that, after printing the ink forms a layer of thickness between 20-200 μm.

3. The method according to claim 1, wherein the ink is of a type which contains a solvent and the at least partial hardening is achieved by drying.

4. The method according to claim 1, wherein the ink is a plastisol and the at least partial hardening is achieve by gelification.

5. The method according to claim 1, wherein the ink is photo-sensitive and the at least partial hardening is achieved by ultraviolet irradiation.

6. The method according to claim 1, wherein the notch follows a line with at least one elongated portion, and the operation of printing the viscous ink is performed over an entire length of the line with an overlap (L) all around the line.

7. The method according to claim 6, wherein the overlap (L) on each side of the line is at least equal to half a width of the notch in a plane of the inner face.

8. The method according to claim 1, wherein the ink has a viscosity of 1-4 St.

9. The method according to claim 1, wherein the viscous printing ink has the constancy of paste.

\* \* \* \* \*

UNITED STATES PATENT AND TRADEMARK OFFICE
CERTIFICATE OF CORRECTION

PATENT NO. : 8,371,223 B2  
APPLICATION NO. : 11/994347  
DATED : February 12, 2013  
INVENTOR(S) : Karim Amrani Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

First Day of September, 2015

Michelle K. Lee

*Director of the United States Patent and Trademark Office*